Oct. 1, 1929. W. PATERSON ET AL 1,729,799
TRACTION AND ANTISKID ATTACHMENT FOR
AUTOMOBILE AND TRUCK DRIVE WHEELS
Filed Feb. 11, 1928
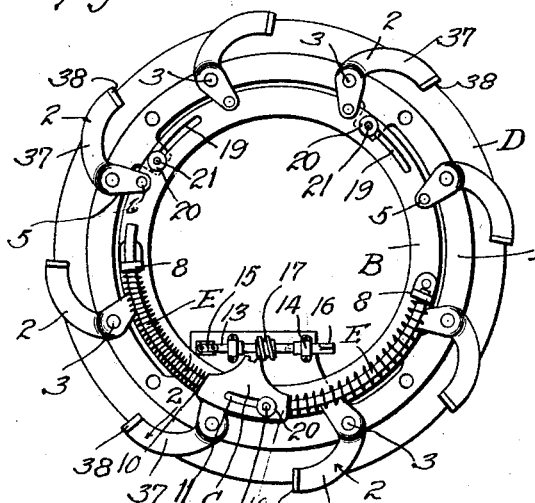
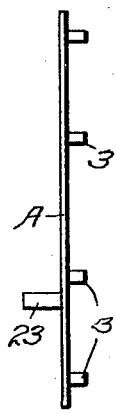
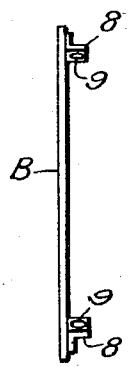
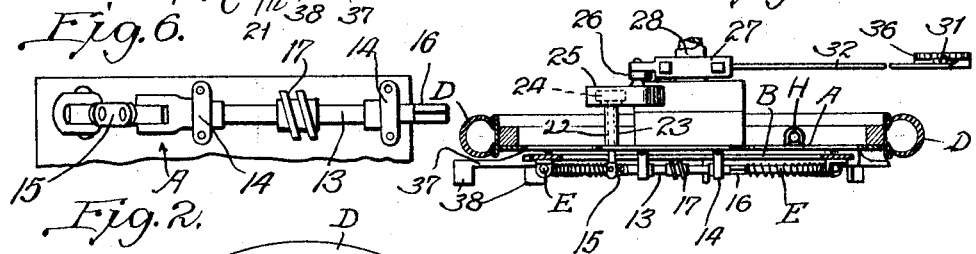
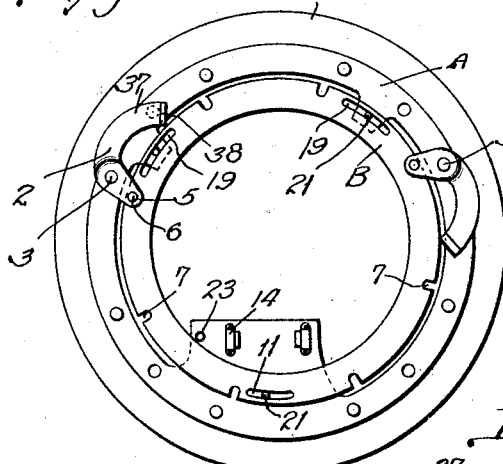
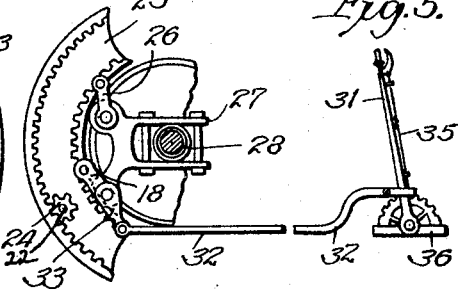
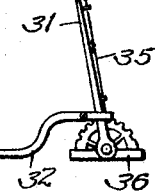
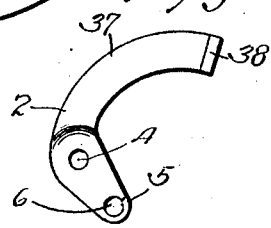
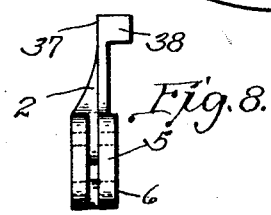

Patented Oct. 1, 1929

1,729,799

UNITED STATES PATENT OFFICE

WILLIAM PATERSON AND MAY H. PATERSON, OF OAKLAND, CALIFORNIA

TRACTION AND ANTISKID ATTACHMENT FOR AUTOMOBILE AND TRUCK DRIVE WHEELS

Application filed February 11, 1928. Serial No. 253,721.

Our invention relates to improvements in a traction and antiskid attachment of the class set forth in our prior application for a traction and antiskid attachment for automobiles and trucks, filed October 4, 1926, Serial No. 139,516. Said application has matured into Patent No. 1,652,133.

The object of our invention is to provide a combination anti-skid and traction device to enable an automobile or truck to travel anywhere over sand, mud, clay, snow or ice, by reason of the resilient paddles having thin sled-like arms and transverse lugs that can be instantly pressed to the ground. A further object is to furnish a device that can be readily attached to and detached from the drive wheels of an automobile or truck.

Our invention consists of certain details of construction, all of which will be more fully explained by referring to the accompanying drawings in which Fig. 1 is a side elevation of a vehicle drive wheel and our invention secured thereto, paddles being shown projected.

Fig. 2 is a side elevation of the same, showing the turnable interior ring slidably mounted upon friction rollers, rotatably journalled within slots in said interior ring and having the paddles withdrawn toward the hub.

Fig. 3 is a top plan view of a horizontal section of a drive wheel and our invention attached thereto.

Fig. 4 is a side view in part of mechanism for raising and lowering the rack rails.

Fig. 5 is an elevation of a reversing lever pivotally mounted upon a sector.

Fig. 6 is a plan view of a shaft mounted on journal boxes, having a universal joint at one end and a square formed to receive a socket wrench at its other end and screw fixed on its center.

Fig. 7 is a side elevation of a paddle.

Fig. 8 is an edge view of a paddle.

Fig. 9 is an edge view of the interior ring.

Fig. 10 is an edge view of the fixed ring.

In the drawings A represents the fixed ring attached to the outer side H of the drive wheel D. B is the turnable annular ring, and C is a gear plate having integral curved rods E, E surrounded by spiral spring F, F. The paddles 2 are pivotally mounted upon studs 3, which are fixed to the ring A. The paddles 2 having bearings 4 oscillate upon studs 3. The paddles 2 having jaws 5 and cross pins 6 are adapted to receive the gabs 7 formed upon the periphery of said turnable ring, said gabs 7 being adapted to slide upon the cross pins 6 within the jaws 5 on the paddles 2. The blocks 8, 8 mounted upon the ring B have perforations 9, 9 adapted to receive the ends of the curved rods E, E which have the spiral springs F, F interposed between the blocks 8, 8 and stops 10, 10 on the curved rods E, E. The slot 11 formed on the gear plate C between stops 10, 10 is adapted to receive a friction roller 20 mounted upon a stud 21 fixed to the fixed ring A. The shaft 13 mounted upon journal boxes 14, 14 is furnished with a universal joint 15 at one of its ends and is squared to receive a socket wrench at its other end 16. On the center of said shaft 13 are threads 17 adapted to engage the gear plate C, which is an integral part of the curved rods E, E. The ring B, has slots 19 in which rollers 20 mounted upon studs 21 fixed to the fixed ring A, are adapted to slide. The universal joint 15 mounted upon the screw shaft 13 is connected to horizontal shaft 22 which is journalled in a housing 23, said shaft 22 having a spur gear 24 adapted to engage with the upper or lower rack rails 25, or to pass between said rack rails without engaging either. Said rack rails have parallel tilting arms 18 and 26, which are mounted pivotally upon a standard 27, said standard being clamped to the axle housing of the drive wheel at 28. The tilting arms 18 and 26 having the curved rack rails 25 on either side of spur gear 24 are capable of being raised and lowered through the medium of the lever 31, the extension rod 32, and crank 33 upon shaft 34. The lever 31 is adjustably operable by means of the pawl 35 and the sector 36. When the upper rack rail 25 is lowered into engagement with the spur gear 24, the latter will revolve and project the paddles outwardly and when the under rack rail 25 is raised into engagement with the spur gear 24, the latter will reverse and draw the paddles in toward the hub. The shaft 13 is square at one of its ends to receive a socket wrench and can be turned in either direction by said socket wrench. Hence, the paddles can be projected or retracted and held at any desired position independent of the spur gear mechanism. The spiral spring F being pressed against the block 8 by the action of the screw on gear plate C rotates the ring B and projects the paddles to their full extent. In turning the gear plate C in the opposite direction the spiral spring F surrounding the rod E that passes through the block 8 will rotate the ring B in the opposite direction and retract the paddles. It will be seen that when the thread of the screw on shaft 13 reaches the end of the cogs on the gear plate C in either direction, said shaft 13 is free to revolve, thus avoiding stripping gear, and, as the pressure of the gear plate C is constantly toward the center of the screw 17, the cogs on the gear plate C promptly enter the threads on the screw 17 at each reversal of the shaft 13. The curved arms 37 and the lugs 38 of the paddles 2 are adapted to come in resilient contact with the ground and thus afford increased traction and prevent skidding when the paddles 2 are projected.

Having thus described our invention what we claim is:

1. A combined traction and anti-skid attachment for vehicle drive wheels comprising a ring adapted to be fixed to the outer side of a drive wheel, a rotatable ring having slots adapted to glide upon friction rollers pivotally mounted upon studs fixed to said fixed ring, gabs formed on the periphery of said rotatable ring adapted to slide upon cross pins fixed between the jaws formed on the inner ends of paddles, said paddles being pivotally mounted upon studs fixed to said fixed ring; a gear plate slidably mounted upon a stud fixed to said fixed ring, said gear plate being an integral part of two curved rods, the outer ends of saids rods being adapted to slide in perforations formed in blocks fixed to said rotatable ring, each of said rods being surrounded by a spiral spring interposed between said blocks and stops formed upon said gear plate, said gear plate being adapted to engage with a screw mounted upon a revoluble shaft.

2. A combined traction and anti-skid attachment for vehicle drive wheels comprising a ring adapted to be fixed to the outer side of a drive wheel, an interior turnable ring mounted upon friction rollers pivotally mounted upon studs fixed to said fixed ring, said turnable ring having gabs formed on its periphery adapted to engage and slide upon cross pins between jaws formed upon the short ends of paddles, said paddles being pivoted on studs fixed to said fixed ring; a gear plate adapted to engage a screw thread mounted upon a revoluble shaft, said shaft being mounted upon journal boxes fixed to the said fixed ring, said revoluble shaft being connected to a horizontal shaft by a universal joint, said horizontal shaft being adapted to revolve in a housing fixed to said fixed ring and having a spur gear fixed to its free end, curved rack rails adapted to engage said spur gear, and means for throwing said rack rails into and out of operation.

WILLIAM PATERSON.
MAY H. PATERSON.